Feb. 28, 1928.
J. BATH
1,660,469
OVERSIZE ATTACHMENT FOR ADJUSTABLE INTERNAL GAUGES
Filed March 1, 1923   2 Sheets-Sheet 1
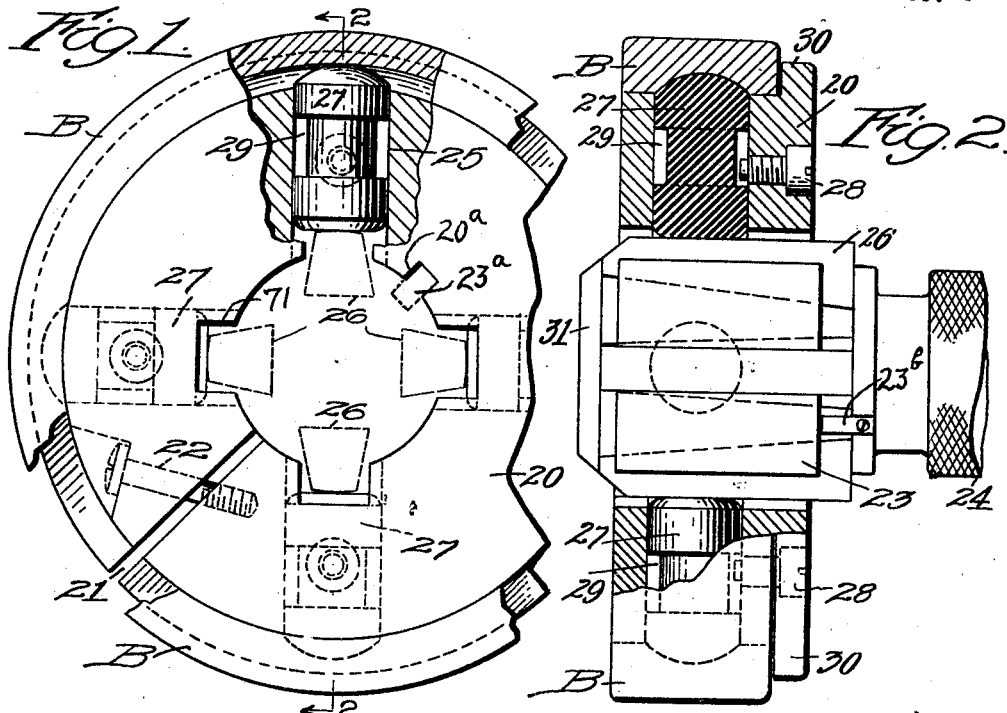
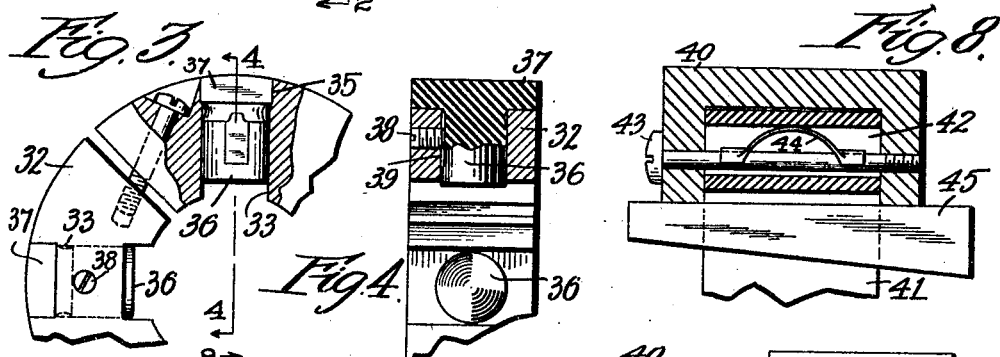
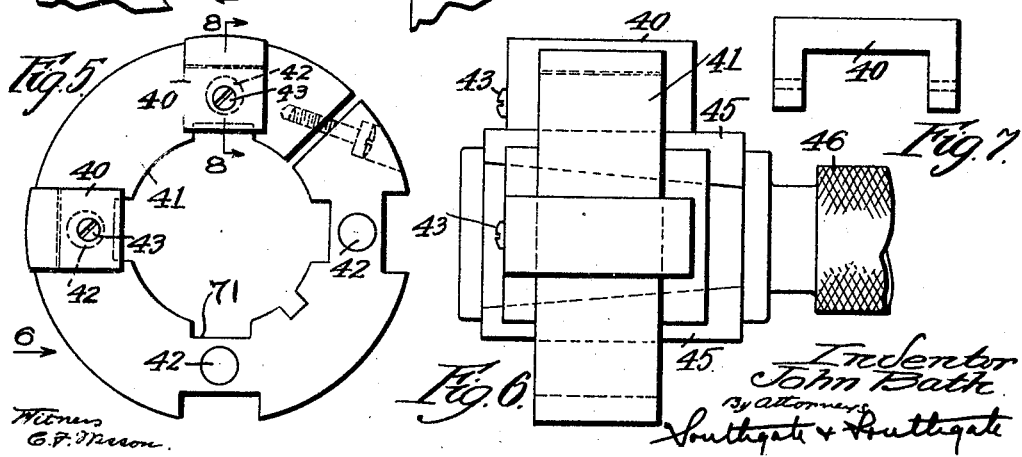
Inventor
John Bath
By attorneys
Southgate & Southgate

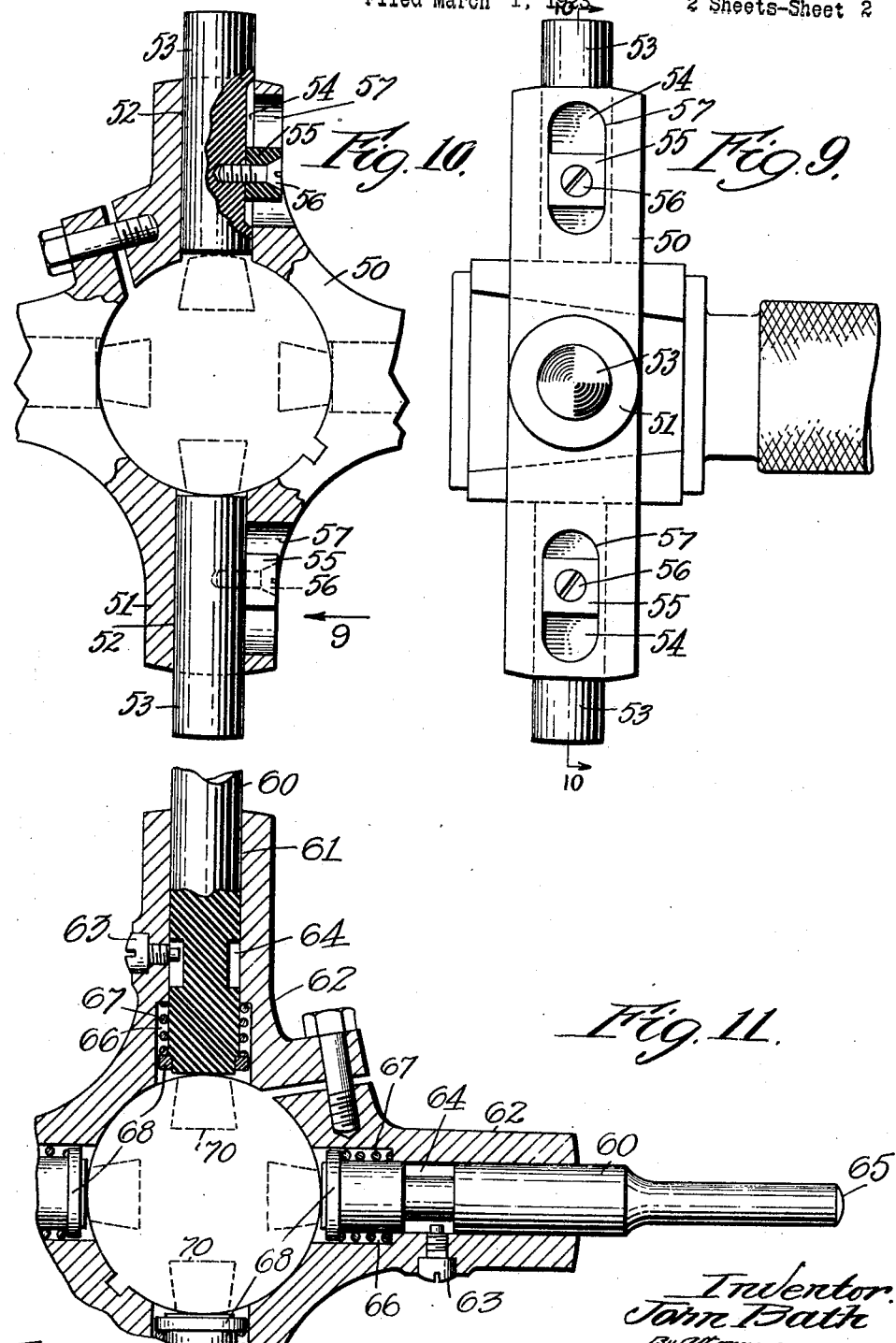

Patented Feb. 28, 1928.

1,660,469

UNITED STATES PATENT OFFICE.

JOHN BATH, OF WORCESTER, MASSACHUSETTS.

OVERSIZE ATTACHMENT FOR ADJUSTABLE INTERNAL GAUGES.

Application filed March 1, 1923. Serial No. 622,226.

This invention relates to an attachment for an internal gauge by means of which the range of usefulness of a single gauge may be greatly extended.

Certain internal gauges of the adjustable type are capable of making extremely fine and accurate measurements but are limited to a very narrow range of adjustment. Consequently it has been heretofore necessary to provide a separate, complete gauge for each size to be measured. This practice has involved a very considerable expense, when a large number of different sizes must be accurately measured.

It is the general object of my invention to provide a simple attachment for adjustable internal gauges by means of which a diameter outside of the range of the gauge may be easily and accurately measured. A set of these attachments covering the desired number of increased sizes may be furnished at a small fraction of the cost of supplying a separate complete gauge for each desired size.

With this general object in view, my invention in its preferred form comprises a ring or support adapted to be clamped or otherwise secured to an adjustable gauge, and a plurality of contact members accurately formed as to length and mounted in or on said ring for engagement with the gauge bars of the internal gauge. The contact members represent a fixed and definite length to be added to the gauge reading to determine the diameter measured.

Several forms of my invention are shown in the drawings in which

Fig. 1 is an end elevation, partly in section, of my gauge attachment adapted for measuring the internal diameter of a ball race;

Fig. 2 is a sectional side elevation, taken along the line 2—2 in Fig. 1;

Fig. 3 is a partial end elevation of a modified form of my gauge attachment;

Fig. 4 is a sectional side view, taken along the line 4—4 in Fig. 3;

Fig. 5 is an end elevation of a second modification of my invention;

Fig. 6 is a side view thereof;

Fig. 7 is a detail view of one of the contact members;

Fig. 8 is an enlarged detail sectional side view, taken along the line 8—8 in Fig. 5;

Fig. 9 is a side elevation of a third modification of my invention;

Fig. 10 is a sectional end elevation thereof, taken along the line 10—10 in Fig. 9; and Fig. 11 is a partial end sectional elevation of a fourth modification.

Referring particularly to Figs. 1 and 2, I have shown a gauge attachment comprising a ring or support 20 which is preferably split as indicated at 21 and is provided with a clamping screw 22 by means of which it may be secured to the member 23 which is of fixed diameter and forms a part of the adjustable internal gauge 24 (Fig. 2). The ring 20 is provided with a number of radial passages 25 preferably corresponding in number to the number of gauge bars 26 in the gauge 24. A plug or plunger 27 is slidably mounted in each passage 25 and is held from displacement by a stud 28 (Fig. 2) extending into an annular groove or recess 29 formed in the plunger 27. A key way 20$^a$ in the ring 20 fits a key 23$^a$ in the member 23 and insures a definite angular relation of the attachment to the gauge bars 26.

While this gauge is capable of general application, it is shown in Figs. 1 and 2 as particularly adapted for measuring the internal diameter of a ball race B. For this purpose, the outer ends of the plungers 27 are given a partially spherical shape, with a curvature corresponding to the curvature of the groove in the ball race B. A flange 30 may be formed on one side of the ring 20 to assist in conveniently positioning the ball race axially on the attachment and a stop 23$^b$ positions the attachment axially on the gauge.

In using the attachment for this purpose, it is found convenient to insert the ring 20 and plungers 27 within the ball race and to thereafter insert the gauge 24 in the ring 20. The plate 31 at the end of the gauge may be beveled as indicated in Fig. 2 and the outer ends of the gauge bars 26 may be correspondingly beveled, so that the plungers 27 will be pushed outward by the simple insertion of the gauge in the ring 20. After being thus inserted, the measurement may be made by expanding the gauge, thus forcing the plungers 27 outward until they contact with the curved inner wall of the ball race B. For such measurements it is not always necessary to clamp the attachment to the gauge.

In Figs. 3 and 4, I have shown a desirable construction of my attachment for use in making simple cylindrical measurements. For this purpose, a ring 32 is provided, for clamping to a portion of an adjustable gauge as previously described. The ring 32 is provided with radial openings or passages 33 and is transversely slotted at the outer end of said passages as indicated at 35. The plungers used in this form of my invention comprise cylindrical body portions 36 having T-shaped heads 37 at their outer ends, the heads 37 being received in the transverse slots 35 and closely engaging the walls of the slots at the outer surface of the ring, preventing transverse displacement of the plungers by uneven contact pressure. A retaining screw 38 extends into a shallow recess 39 formed on one side of the sliding plunger and prevents displacement thereof. The outer face of the T-shaped head 37 is ground to form a portion of a cylindrical surface having a curvature not greater than that of the smallest diameter to be measured.

In Figs. 5 to 8 inclusive, I have shown a form of my invention in which the contact members 40 are slidably mounted to embrace the ring 41, instead of being mounted in recesses therein. Transverse openings 42 are formed in the ring 41 and a screw 43 is mounted in each contact member and extends through the corresponding opening 42. This screw is of much less diameter than the opening and permits the contact member to move radially. A spring 44 may also be provided for each contact member, which holds the member in yielding contact with the corresponding gauge bar 45 of the gauge 46 upon which the attachment is mounted. This form of my invention has the marked advantage that the gauge members 40 contact with the gauge bars 45 at both extreme ends of said members, thus forming a wide bearing and giving an accurate reading even when the wall of a conical or irregular hole makes contact with the members 40 only at one end thereof.

In Figs. 9 and 10, I have shown a form of my invention particularly adapted for larger measurements and in which a ring or support 50 of somewhat different form is utilized. This ring is provided with outwardly projecting bearing portions 51 having radial passages 52 for the contact members 53. These members may be cylindrical, as shown in the drawings, and are preferably each provided with a flat surface 54 on one side thereof against which a rectangular block 55 is secured by a screw 56. The block 55 is slidable in a slot 57 formed in the side of the projecting bearing portions 51. The plungers are thus slidably mounted in the support 50 for free radial movement but are held from angular movement and displacement by the blocks 55.

In Fig. 11 I have shown a type of attachment particularly adapted for still greater diameters, with the plungers 60 of considerable length and retained in the openings 61 of the support 62 by screws or studs 63 extending into annular grooves 64 in the plungers, the construction being similar in this respect to that shown in Fig. 2. The plungers 60 may be of any desired length and the outer ends thereof are preferably rounded or curved as indicated at 65. The inner end of each opening 61 may be enlarged as shown at 66 to receive a spring 67 mounted on the plunger 60 and held thereon by a ring or washer 68 forced into place as the parts are assembled. The springs 67 firmly seat the plungers 66 against the gauge bars 70.

This spring construction is obviously also adapted for use with the forms of plungers shown in Figs. 2, 4 and 10, and may be added thereto without change or adaptation of the construction shown in Fig. 11. In some forms I have shown the ring or support as slotted at 71 to permit the gauge bars to engage the plungers beyond the inner surface of the ring, and in other forms the ring is not slotted, the outer position of the gauge bars corresponding with the surface of the member 23. Both constructions are interchangeable in any form of the invention.

Having thus described several forms of my invention and the purposes thereof, it will be seen that I have provided an extremely simple attachment for an adjustable internal gauge, by means of which the gauge may be adapted at small expense to measure any desired increased diameter. I do not wish to be limited to the details of construction herein disclosed otherwise than as set forth in the claims as changes and modifications can be made therein by those skilled in the art within the spirit and scope of my invention, but what I claim is—

1. An oversize attachment for an internal gauge having radially adjustable gauge bars, said attachment comprising a contact support, and a plurality of contact members assembled with said support and radially movable therein, said attachment being adapted to be connected with said internal gauge with the inner ends of the contact members in engagement with the outer or contact ends of said radially adjustable gauge bars.

2. An oversize attachment for an internal gauge having radially adjustable gauge bars, said attachment comprising an annular support, means to secure said support on a portion of said internal gauge, and a plurality of contact members assembled with said support and movable radially therein by engagement of said contact members with said gauge bars.

3. An oversize attachment for an internal gauge having radially adjustable gauge bars, said attachment comprising a support adapted to be connected with said gauge, a plurality of radially movable contact members assembled with said support, with their inner ends in contact with the outer surfaces of said gauge bars, and means to move said members yieldingly inward to engage said gauge bars.

4. An oversize attachment for an internal gauge having radially adjustable gauge bars, said attachment comprising a ring having a plurality of radial passages therein, said ring being adapted to be connected to said gauge, contact plungers freely slidable in said radial passages and positioned to engage the gauging surfaces of said gauge bars, and means to prevent displacement of said plungers.

5. An oversize attachment for an internal gauge having radially adjustable gauge bars, said attachment comprising a ring having a plurality of radial passages therein, said ring being adapted to be connected to said gauge, contact plungers freely slidable in said radial passages and positioned to engage the gauging surfaces of said gauge bars, means to prevent displacement of said plungers, and means to hold said plungers in yielding engagement with said bars.

6. An oversize attachment for an internal gauge having radially adjustable gauge bars, said attachment comprising a ring substantially surrounding said gauge and having a plurality of radial passages therein, said ring being adapted to be connected to said gauge, contact plungers freely slidable in said radial passages and positioned to engage the gauging surfaces of said gauge bars, and means to prevent displacement of said plungers, said means comprising studs on said ring each extending into an annular recess on a selected plunger.

7. An oversize attachment for an internal gauge having radially adjustable gauge bars, said attachment comprising a contact support, a plurality of contact members assembled with said support and radially movable therein, said attachment being adapted to be connected with said internal gauge with the inner ends of the contact members in engagement with the outer or contact ends of said radially adjustable gauge bars, and a guide on said support effective to position the work axially on said support.

8. An oversize attachment for an internal gauge having radially adjustable gauge bars, said attachment comprising a contact support, a plurality of contact members assembled with said support and radially movable therein, said attachment being adapted to be connected with said internal gauge with the inner ends of the contact members in engagement with the outer or contact ends of said radially adjustable gauge bars, and means on said support and gauge, cooperating to locate said support in a definite angular position on said gauge.

9. An oversize attachment for an internal gauge having radially adjustable gauge bars, said attachment comprising a contact support, a plurality of contact members assembled with said support and radially movable therein, said attachment being adapted to be connected with said internal gauge with the inner ends of the contact members in engagement with the outer or contact ends of said radially adjustable gauge bars, and means on said support and gauge, cooperating to prevent relative angular movement thereof but permitting said support to slide axially on said gauge.

10. An oversize attachment for an internal gauge having radially adjustable gauge bars, said attachment comprising a contact support, and a plurality of contact members assembled with said support and radially movable therein, said attachment being adapted to be connected with said internal gauge with the inner ends of the contact members in engagement with the outer or contact ends of said radially adjustable gauge bars, said support having radial openings for said contact members, with transverse slots at the outer ends of said openings, and said contact members having T-shaped heads closely fitting said slots at the sides thereof.

11. An oversize attachment for an internal gauge having radially adjustable gauge bars, said attachment comprising a contact support and a plurality of contact members assembled with said support and radially movable therein, said attachment being adapted to be connected with said internal gauge with the inner ends of the contact members in engagement with the outer or contact ends of said radially adjustable gauge bars, said support having axially extending recesses therein to permit said gauge bars to move outward in engagement with said contact members beyond the inner face of said support.

In testimony whereof I have hereunto affixed my signature.

JOHN BATH.